United States Patent
Marshall

[11] Patent Number: 6,129,495
[45] Date of Patent: Oct. 10, 2000

[54] WHEELED CARRIAGE FOR TRANSPORTING PREFAB HOMES AND THE LIKE

[75] Inventor: Kenneth D. Marshall, Blountville, Tenn.

[73] Assignee: Jadde, LLC, Blountville, Tenn.

[21] Appl. No.: 09/257,409

[22] Filed: Feb. 25, 1999

[51] Int. Cl.$^7$ ............................................. B60P 1/02
[52] U.S. Cl. ........................ 414/12; 414/495; 414/471; 280/91.1; 180/411
[58] Field of Search ............................. 414/10, 12, 495, 414/458, 471, 589; 180/6.48, 254, 411; 280/91.1, 149.2, 656; 254/9 R

[56] References Cited

U.S. PATENT DOCUMENTS

| | | | |
|---|---|---|---|
| 2,896,909 | 7/1959 | Taylor | 254/9 R |
| 4,854,805 | 8/1989 | Altoff et al. | 414/495 |
| 5,012,879 | 5/1991 | Bienek et al. | 414/495 |
| 5,151,004 | 9/1992 | Johnson | 414/495 |
| 5,531,466 | 7/1996 | Hayashi | 280/91.1 |

*Primary Examiner*—Douglas Hess
*Assistant Examiner*—Joseph A. Fischetti

[57] ABSTRACT

A tandem wheeled carriage of heavy, very strong steel construction capable of lifting 5 to 30 or more tons of load and transporting the same over difficult roadways, wherein a laterally spaced pair of lift devices is provided on the carriage and adapted to be connected to laterally spaced supporting beams of the load, wherein each lift device is operable independently of the other to selectively lift or lower either or both sides of the load to avoid obstacles, and wherein a steering mechanism is provided to synchronously pivot all wheels of the tandem thru a steering angle whereby the rear of the load can be steered straight ahead or also in lateral directions to avoid obstacles and to allow maneuvering of a long load around corners which are too sharp for conventional transport devices.

11 Claims, 4 Drawing Sheets

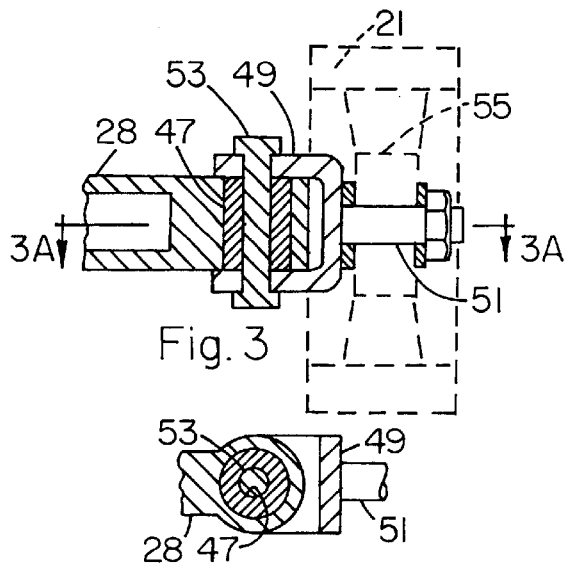
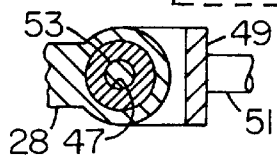
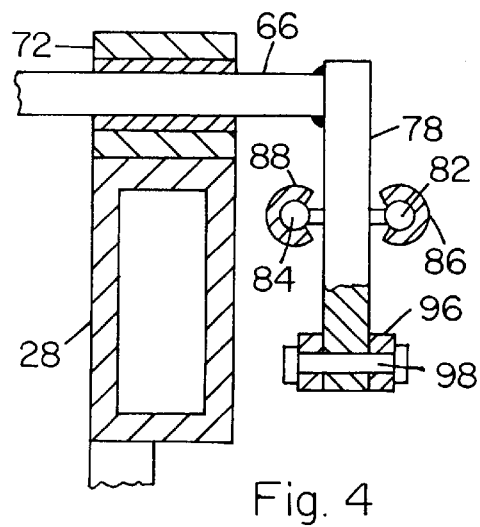
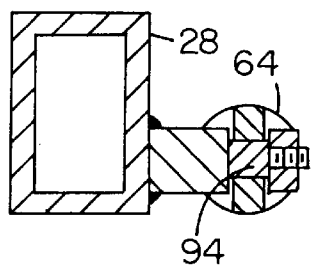
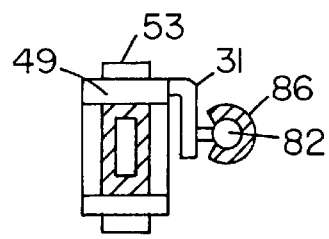
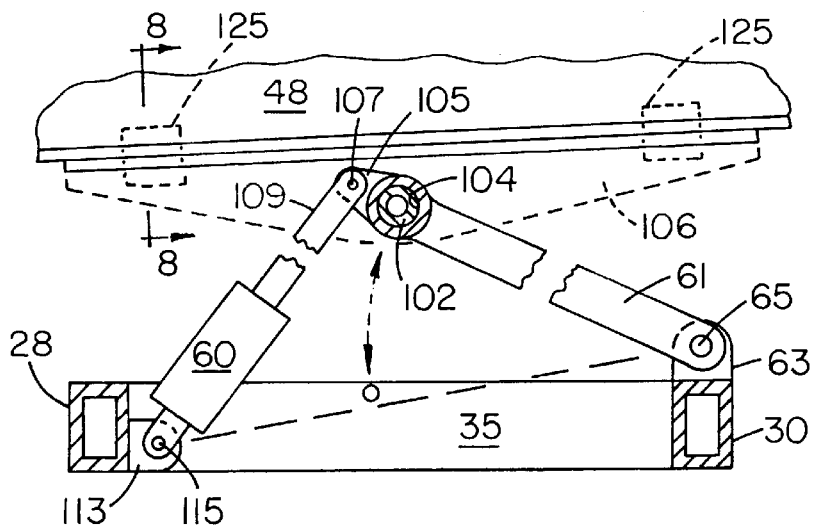

WHEELED CARRIAGE FOR TRANSPORTING PREFAB HOMES AND THE LIKE

FIELD

This invention concerns a carriage device or dolly for transporting large, heavy and cumbersome structures such as prefab homes, large equipment, or the like, and particularly where the roadway is uneven, sharply curved, narrow, confined by trees or boulders or the like, or consists of unstable soil, especially at the roadway edges.

PRIOR ART

Heretofore, prefab home structures such as a half of a double wide prefab have been mounted on wheel assemblies such as the common two wheel tandems and secured thereto for transportation to the lot site where each half, in turn, is to be placed on a more permanent foundation. The transportation of such structures, or of entire prefab homes, either of which can weigh up to 20 tons or so, is often made nearly impossible where the roadway is unstable, laterally slanted, confined, particularly around corners, passes over narrow country bridges with railing or the like, or is narrowed in places by boulders or tree stumps or other generally unyielding objects. These transportation difficulties are essentially insoluble when employing prior common tandems or single axle wheel assemblies which allow only longitudinal motion of the wheels and load, following in straight alignment behind the tractor or truck hitch.

SUMMARY OF THE INVENTION

The present invention provides, by sharp contrast, any of a combination of motions to the load including tilting of the load about its longitudinal axis, raising or lowering of the load, and angular lateral steering such as to maneuver the load over or past the aforementioned otherwise difficult or impassable road conditions.

In brief summary, the invention comprises a tandem wheeled carriage of heavy, very strong steel construction capable of lifting 5 to 30 or more tons of load and transporting the same over difficult roadways, wherein a laterally spaced pair of lift means is provided on the carriage and adapted to be connected to laterally spaced supporting beams of the load, wherein each lift means is operable independently of the other to selectively lift or lower either or both sides of the load to avoid obstacles, and wherein a steering mechanism is provided to synchronously pivot all wheels of the tandem thru a steering angle whereby the rear of the load can be steered straight ahead or also in lateral directions to avoid obstacles and to allow maneuvering of a long load around comers which are too sharp for conventional transport means.

BRIEF DESCRIPTION OF THE DRAWINGS

The invention will be further understood from the following description and drawings wherein the depiction's are not to scale and wherein certain structural portions are enlarged out of proportion or broken away or sectioned for clarity:

FIG. 3 is a cross-sectional view taken along line 3—3 of FIG. 1 in the direction of the arrows;

FIG. 3A is a cross-sectional view taken along line 3A—3A of FIG. 3 in the direction of the arrows;

FIG. 4 is a cross-sectional view taken along line 4—4 of FIG. 2 in the direction of the arrows;

FIG. 5 is a cross-sectional view taken along line 5—5 of FIG. 1 in the direction of the arrows:

FIG. 6 is a cross-sectional view taken along line 6—6 of FIG. 2 in the direction of the arrows FIG. 7 is a cross-sectional view taken along line 7—7 of FIG. 1 in the direction of the arrows, and along line 7A—7A of FIG. 1 showing a preferred lift means and, in phantom line, a wing piece of the first coupling means and a lower portion of a longitudinally extending support beam of a prefab home or other load;

DETAILED DESCRIPTION

Figure 1:
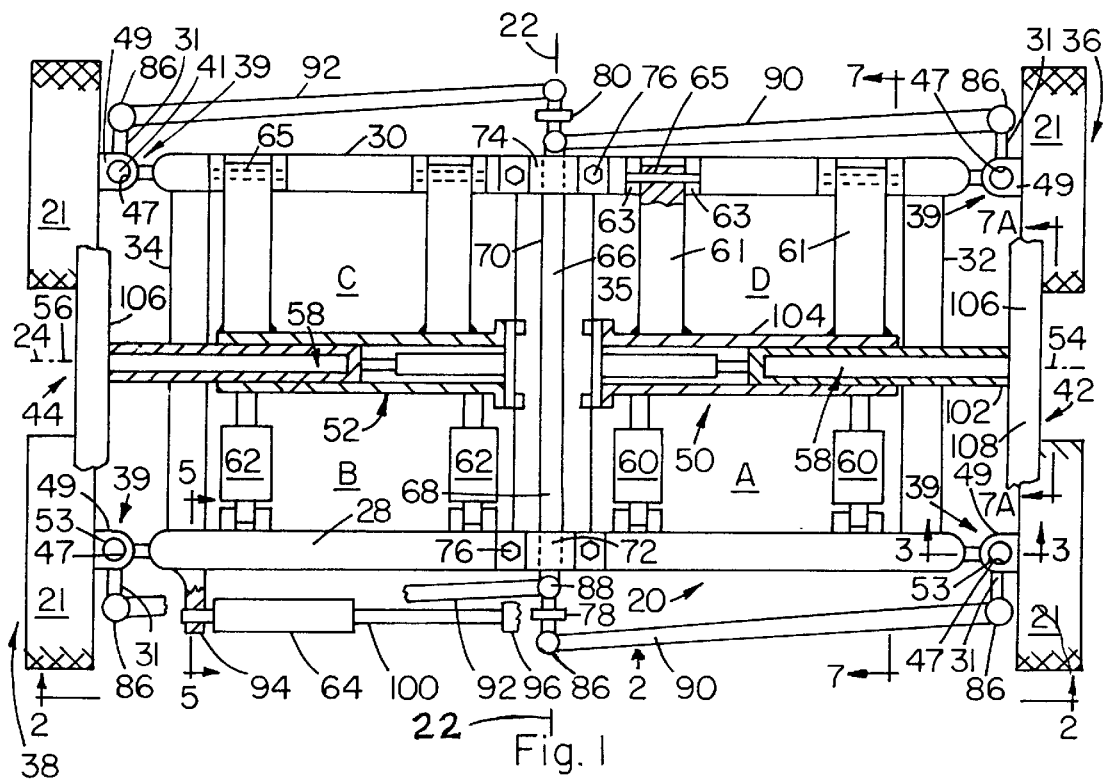
FIG. 1 is a top down view of the present carriage.

With reference to the claims and drawings, the present device comprises base means generally designated 20 having a longitudinal axis 22, a lateral axis 24, a functional plane 26, front 28, rear 30 and first 32 and second 34 side portions tandem wheel sets 36, 38 mounted longitudinally on said base means adjacent each said side portion, each wheel 21 being pivotally mounted on said base means by separate pivot means 39 each having a pivot axis 41 oriented substantially normal to said functional plane, each said pivot means allowing its associated wheel to pivot about a pivot axis thru a steering angle of up to about 120°, steering means generally designated 40 interconnecting all said wheels for synchronously positioning the same at the same steering angle, first coupling means 42 adjacent said first side portion 32 and second coupling means 44 adjacent said second 34 side portion for engaging laterally spaced load support members 46 and 48 respectively on said load, first lift means 50 mounted on said base means and connected to said first coupling means 42 for selectively elevating or lowering said first coupling means relative to said functional plane 26, and second lift means 52 mounted on said base means and connected to said second coupling means 44 for selectively elevating or lowering said second coupling means relative to said functional plane, each said first and second lift means having a generally lateral dynamic lift axis 54 and 56 respectively and being operable independently of the other lift means and of said steering means whereby said load can be maintained substantially in a given posture or intentionally tilted therefrom, each said coupling means having a pivot means such as 58 for allowing said load support members or beams 46, 48 and load to rotate about said dynamic lift axes, and first 60 and second 62 power means for independently operating each said first and second lift means, and third power means 64 for operating said steering means.

Figure 15:
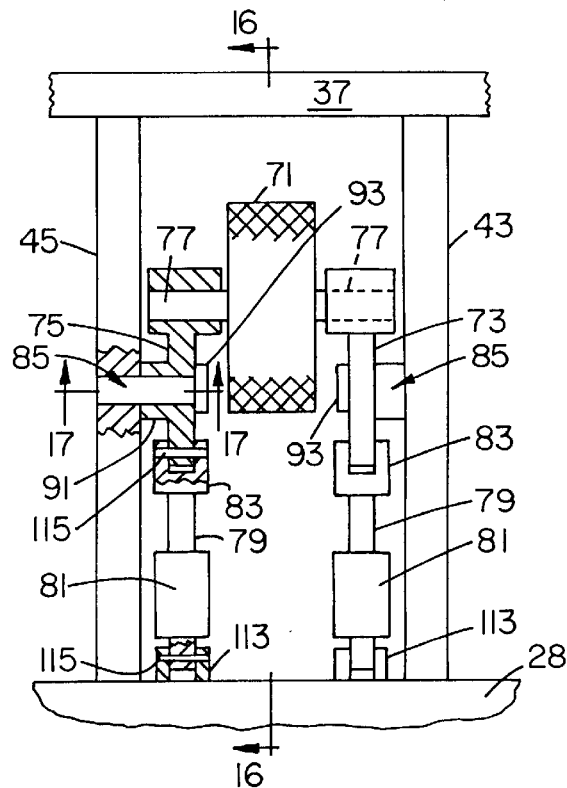
FIG. 15 is a top down view of area A of FIG. 1 showing a variation of the base means and the general location for mounting an additional retractable in-board wheel for further stabilizing the carriage on narrow roads.

The base means 20 preferably is constructed from very sturdy steel members such as 3 in.×6 in., box steel. An exemplary base consists of frame side members 32, 34 and front and rear frame members 28, 30 respectively and center frame member 35. Additional frame members such as 37 in FIG. 13, and 43 and 45 in FIG. 15 are provided for supporting certain structures in addition to or as variations of the structure described in the above paragraph.

The longitudinal axis 22 is taken thru the midway point between the side members, and the lateral axis 24 is taken thru the midway point between the wheels, both axes lying in the functional plane 26 which extends thru the rotational axes of both wheel sets.

Each pivot means 39, on the ends of members 28, 30 in the exemplary embodiment shown, comprises a bearing 47, a steering knuckle 49 with fixed to a wheel spindle or axle 51 for mounting thru the hub 55 of wheel 21 in a conventional manner ,and a steering arm 31, and a kingpin 53 pivotally mounting 49 to the end of the member.

The steering means 40 can be of a variety of constructions including, e.g., rack and pinion, but the type shown in the drawings is preferred for its simplicity and operability. It consists of a steering shaft 66 rotatably mounted at its ends 68, 70 in a pair of pillow blocks 72, 74 respectively, or equivalent type bearings secured to members 28 and 30 respectively such as by bolts 76. Identically configured crank arms 78 and 80 are welded or otherwise rigidly affixed to opposite ends of shaft 66 and oriented 180° offset from each other on shaft 66 such that rotation of the shaft in a particular direction will steer all wheels synchronously in the same direction, as described more explicitly below. For each wheel set 36, 38, a pair of ball journals 82, 84 are affixed to opposite sides of each crank arm and receive the bearing or socket ends 86, 88 of tie rods 90 and 92 respectively of the wheel set to form steering ball joints, as shown for set 38 in FIG. 4.

Each said tie rod is connected by ball joint structure such as 82, 86 to the steering lever arms 31 on steering knuckles 49. It is noted that for space limitation reasons all lever arms 31 face longitudinally outwardly of the base 20, and for this reason the crank arms 78, 80 are offset 180°on shaft 66. Such would not be a requirement for a carriage construction which afforded more space for pivotal operation of the crank arms.

In the embodiment shown, a third power means 64, preferably a double acting hydraulic cylinder, is pivotally attached to member 28 by pivot pin 94 and to arm 78 by clevis 96 and pin 98 such that extension of piston 100 will rotate all wheels counterclockwise, and retraction of the piston will rotate all wheels clockwise as viewed in FIG. 1, in a synchronous manner.

The coupling means 42 and 44 are substantially identical in structure and can be described with reference to 42 and to first lift means 50. In this coupling means a shaft 102, which may be a thick walled accurately exteriorly shaped round pipe, is rotatably and slidably mounted in an interiorly accurately shaped round bearing pipe 104. The close tolerance, smooth contact between the two pipes provide the aforesaid pivot means 58. The outboard end of 102 is welded to a wing piece 106, preferably of 6 feet or more in length and having an upper surface 108 which is substantially straight in a longitudinal direction.

Figures 8, 9, 10:
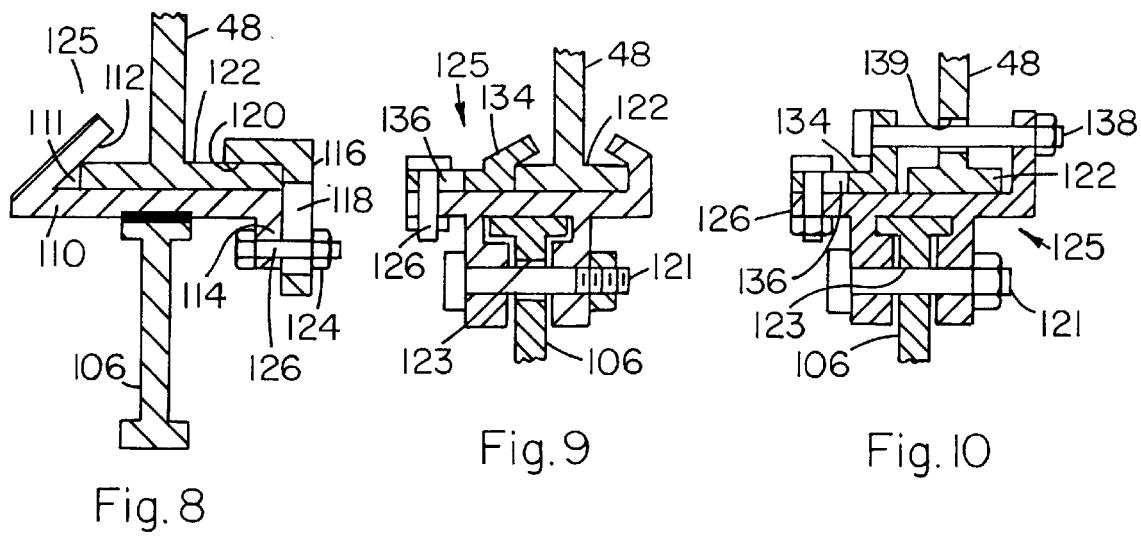
FIG. 8 is a cross-sectional view taken along line 8—8 of FIG. 7 of a segment of a coupling means affixed to a load support beam by a clamping attachment means.
FIG. 9 shows a variation of the structure of FIG. 8.
FIG. 10 shows another variation of the structure of FIG. 8.

The support beam 48 of the load is removably secured to wing piece 106 by any suitable means, but preferably clamped is in longitudinally spaced locations to wing piece 106 by special attachment means 125 as shown in one embodiment most illustratively in cross-section in FIG. 8. This preferred clamping attachment means 125 comprises a plate 110 having a length, e.g., of about 10 inches, a wedge shaped edge 112 and a longitudinal turned down edge 114. A separate clamping segment 116 is provided with one or more adjustment slots 118 whereby a clamping surface 120 can be brought to bear against the beam foot 122 and nuts 124 tightened on bolts 126 against 116 to hold the load support or beam in place on the wing piece. It is noted that either the wedge shaped opening 111 of edge 112 or the surface 120 of segment 116 can be oriented laterally inwardly of the beam, although it is preferred that edge 112 lie outboard of the beam 48. It is noted that a lateral adjustment of the coupling means relative to beam 48 is provided by means of a double acting hydraulic cylinder 128 mounted in pipe 104 and its piston 130 affixed to the inner end 132 of shaft 102. Such adjustment will allow opening 111 to be brought toward foot 122 in a carefully regulated but forceful manner such that if needed, a certain amount of play or looseness in the clamping can be achieved such as to allow the beam to slightly twist from side to side.

The clamping or attachment means 125 can be widely varied and alternative means are shown in FIGS. 9 and 10 wherein elements equivalent to those of FIG. 8 are numbered the same. In FIGS. 9 and 10 the member 134 is provided with a slot 136 for adjustment toward foot 122, and in FIG. 10 a bolt 138 mounted thru aperture 139 in beam 48 is used to secure the beam to the attachment means. Bolts 121 may be mounted thru apertures 123 in wing piece 106 to secure 106 to the clamping means 125

Figure 2:
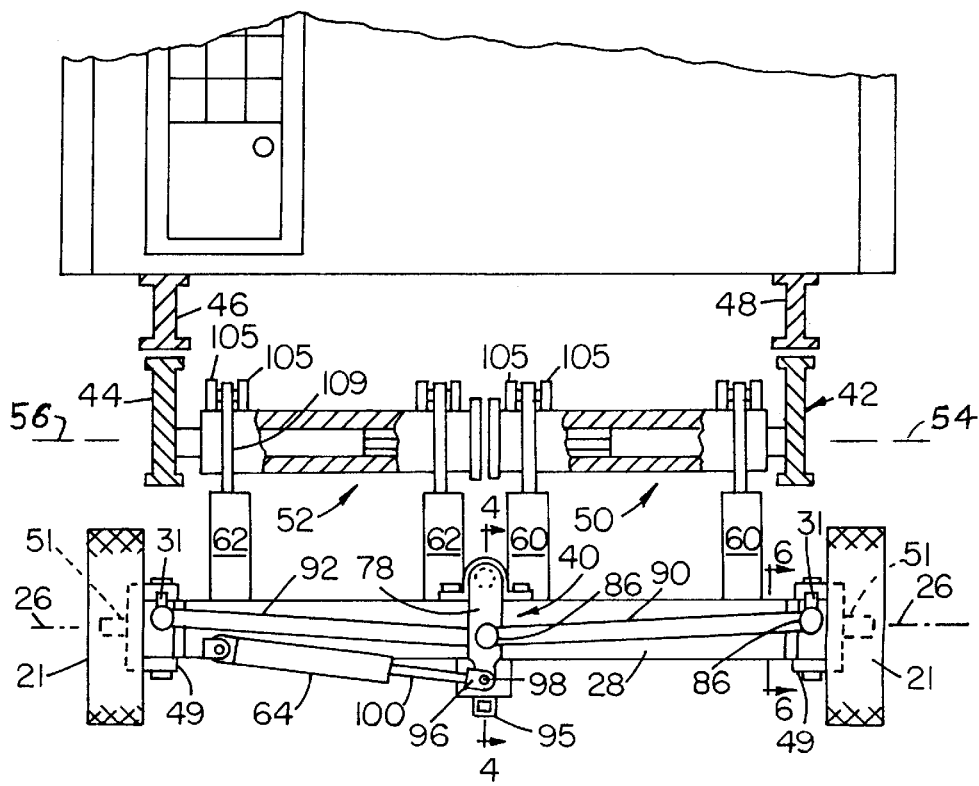
FIG. 2 is a front view of the carriage taken generally in the direction of line 2—2 in FIG. 1.
Figures 11, 12:
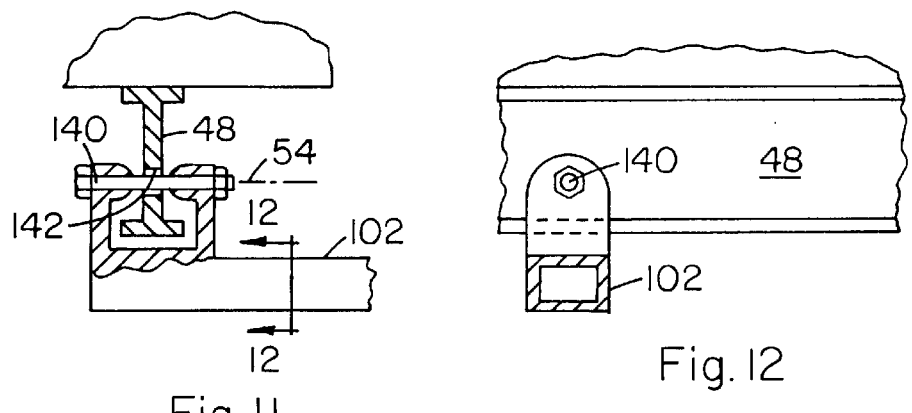
FIG. 11 shows a variation in the structure of the coupling means of FIG. 1 and clamping attachment means.
FIG. 12 is a view taken along line 12—12 of FIG. 11.

Referring to FIGS. 11 and 12 wherein equivalent or similar structure to that of FIGS. 1 and 2 are numbered the same, shaft 102 and pipe 104 in this embodiment are square nesting tubing or equivalent such that 102 does not rotate relative to the lift means described in further detail below. The dynamic lift axes 54 and 56 are provided by bolts 140 which are also part of the couplings. These bolts are preferably loosely mounted thru bolt holes 142 thru the load support beams such that the beams may rock to the sides as the lift means are operated rather than place torsion forces thereon.

Referring to FIG. 7, the lift means 50, 52 are identical in structure and are herein described with reference to 50. The aforesaid bearing pipe 104 is provided with bearing blocks 105 which pivotally support pivot shafts 107 fixed thru the pistons 109 of double acting hydraulic cylinders 60. The cylinder ends are likewise pivotally mounted to the base by bearing blocks 113 and pivot shafts 115.

Generally opposing the power means 60 are props 61 each of which are pivotally mounted at one end to the base by bearing block 63 and shaft 65, and which is welded at its other end to the bearing pipe 104.

Figure 13:
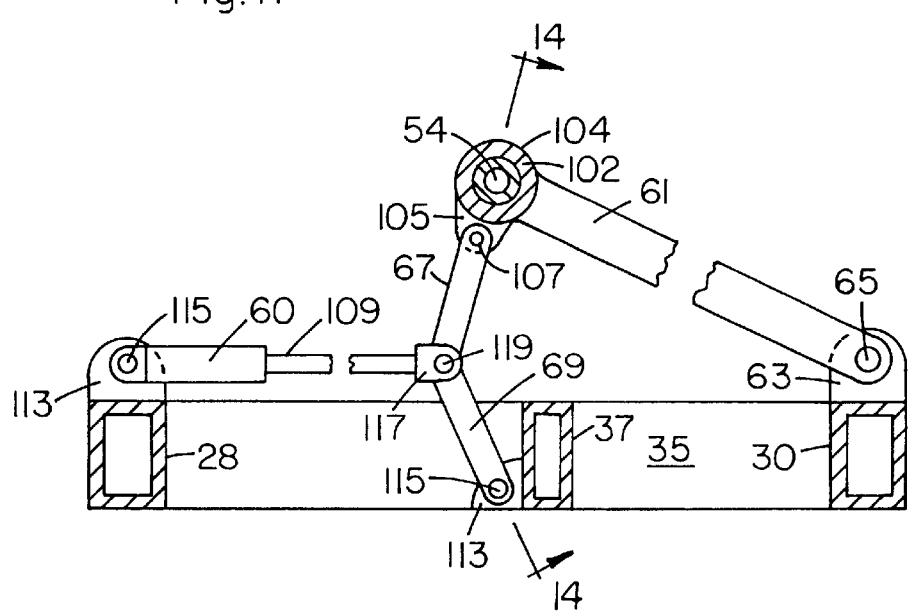
FIG. 13 is a view as in FIG. 7 but showing a variation of the lift means structure.
Figure 14:
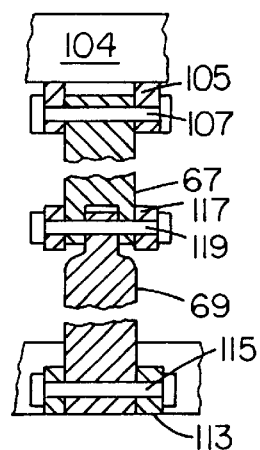
FIG. 14 is a cross-sectional view taken along line 14—14 of FIG. 13.

Referring to FIGS. 13 and 14 wherein structure equivalent or similar to that of FIGS. 1, 2 and 7 are numbered the same, an alternative structure for the lift means is shown wherein the pistons 109 are pivotally connected by clevis 117 and pin 119 to the inner ends of scissor arms 67 and 69 which arms are pivotally mounted at their outer ends to 104 and 37 respectively. Extension of the pistons will raise pipe 104 and the coupling, and retraction of the pistons will lower the same.

Figure 16:
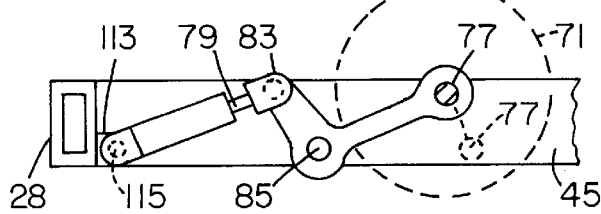
FIG. 16 is a cross-sectional view taken along line 16—16 of FIG. 15 in the direction of the arrows.
Figure 17:
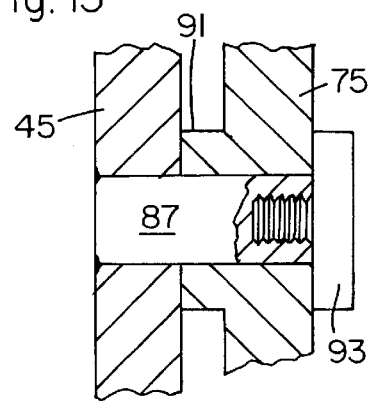
FIG. 17 is an enlarged cross-sectional view taken along line 17—17 of FIG. 15 in the direction of the arrows.

Referring to FIGS. 15–17, auxiliary and retractable but non-steerable wheels 71 may be provided in any or all of locations A, B, C or D in FIG. 1 in order to allow the operator to use these wheels in situations where, for example, the roadway is too narrow for a primary tandem wheel set 36, or 38 to engage the road surface in a secure manner.

In this embodiment wherein structures equivalent to that of prior figures are numbered the same, additional frame members 37, 43 and 45 are provided. Pivotally mounted at 85 to members 43 and 45 are a pair of crank members 73, 75, the inner ends of which support a wheel axle 77, and the outboard ends of which are pivotally connected to the pistons 79 of double acting hydraulic cylinders 81 by clevis elements 83 and pivot shafts ssuch as 115. An exemplary pivotal mounting 85 for each crank member is shown in FIG. 17 as a shaft segment 87 welded into the adjacent frame member 45, a wear bushing 91 and a retaining bolt 93.

In operation, retraction of pistons 81 will clear the wheel 71 from the roadway, and extension of the pistons will forcefully engage the wheel with the roadway.

Figure 18:
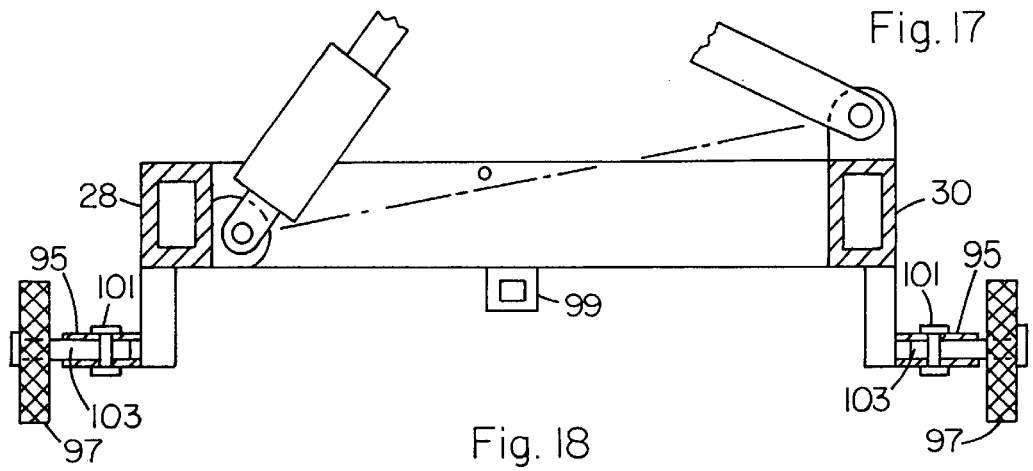
FIG. 18 is a side view as in FIG. 7, mainly of the carriage frame, showing the position and mounting of the to-the-job site carriage delivery wheels.

Referring further to FIGS. 2 and 18, the base is provided on each of the front 28 and rear 30 frame members with a to-the-job site wheel 97 which is quick disconnect mounted to a tubular steel bushing 95 in known manner. These wheels which are substantially lower below the base than the tandem sets 36, 38 allow the carriage to be towed thru a hitch connected to a hitch tube 99 on the frame. These wheels are placed on and removed from the carriage by jacking or lifting the carriage and placing (or removing) bolt 101 or other disconnect mechanism thru the bushing 95 and wheel shaft 103.

All of the hydraulic cylinders are operable by the conventional hand lever operated valve control systems and the hydraulic pressure can be supplied by any known means, but preferably, by a 12 v. portable pump unit such as a Model 304, 1500 psi unit from Monarch Hydraulic, Inc., of Grand Rapids, Mich. Also, a conventional hand held remote control, extension wired to the control system can be employed. Also, wireless 12 v. remote control means such as Model 814/919 from Touchtronics, Inc., of Elkhart, Ind. can be used to regulate the pressure selectively applied to each hydraulic cylinder.

The invention has been described in detail with particular reference to preferred embodiments thereof, but it will be understood that variations and modifications will be effected with the spirit and scope of the invention.

I claim:

1. A tandem wheeled carriage for transporting large and heavy loads along roadways which may be curved and difficult, said carriage comprising base means having a longitudinal axis, a lateral axis, a functional plane, front, rear and first and second side portions, tandem wheel sets mounted longitudinally on said base means adjacent each said side portion, each wheel being pivotally mounted on said base means by separate pivot means each having a pivot axis oriented substantially normal to said functional plane, each said pivot means allowing its associated wheel to pivot about a pivot axis thru a steering angle of up to about 120°, steering means interconnecting all said wheels for synchronously positioning the same at the same steering angle, first coupling means adjacent said first side portion and second coupling means adjacent said second side portion for engaging respective laterally spaced load support members on said load, first lift means mounted on said base means and connected to said first coupling means for selectively elevating or lowering said first coupling means relative to said functional plane, and second lift means mounted on said base means and connected to said second coupling means for selectively elevating or lowering said second coupling means relative to said functional plane, each said first and second lift means having a generally lateral dynamic lift axis and being operable independently of the other lift means and of said steering means whereby said load can be maintained substantially in a given posture or intentionally tilted therefrom, each said coupling means having pivot means for allowing said load support members and load to rotate about said dynamic lift axes, and first and second power means for independently operating each said first and second lift means, and third power means for operating said steering means.

2. The carriage of claim 1 wherein each said lift means comprises (a) an elongated bearing structure encompassing said lift axis for rotatably mounting an elongated inboard journal section of said coupling means, (b) arm means having one end portion thereof pivotally mounted on said base means and having its other end portion affixed to said bearing structure, said arm means being pivotal about an axis oriented substantially parallel to said lateral axis, and (c) said power means for said first and second lift means comprises hydraulic cylinder means pivotally affixed to said base means and to said first and second lift means, wherein said journal section is provided at an outboard end thereof with an elongated wing section which is oriented generally normal to said lift axis such as to lie substantially parallel to said load support members, and wherein attachment means is provided on said wing section for securing said coupling means to a load support member.

3. The carriage of claim 1 wherein each said power means comprises double acting cylinder means, and wherein electronic remote control means is provided for operating each cylinder means.

4. The carriage of claim 2 wherein each said power means comprises double acting cylinder means, and wherein electronic remote control means is provided for operating each cylinder means.

5. The carriage of claim 2 wherein said cylinder means is actuable by remote control means which is electronically wired to the hydraulic control center for selectively actuating each cylinder means.

6. The carriage of claim 1 wherein at least two additional wheel means are provided mounted on said base means inboard of said tandem sets for stabilizing the carriage and load should an roadway become too narrow to support one of said tandem sets, wherein pivot means is provided for each said additional wheel means, and retraction means is provided on said base means and connected to said pivot means for raising and lowering said additional wheel means.

7. The carriage of claim 6 wherein said retraction means comprises hydraulic cylinder means.

8. The carriage of claim 7 wherein said cylinder means is actuable by a remote control electronic signal.

9. A prefab home construction having a pair of longitudinally extending, laterally spaced support members affixed to the underside of the construction, wherein a carriage is affixed to said members for transporting the construction along difficult roadways, said carriage comprising base means having a longitudinal axis, a lateral axis, a functional plane, front, rear and first and second side portions tandem wheel sets mounted longitudinally on said base means adjacent each said side portion, each wheel being pivotally mounted on said base means by separate pivot means each having a pivot axis oriented substantially normal to said functional plane, each said pivot means allowing its associated wheel to pivot about a pivot axis thru a steering angle of up to about 120°, steering means interconnecting all said wheels for synchronously positioning the same at the same steering angle, first coupling means adjacent said first side portion and second coupling means adjacent said second side portion for engaging respective laterally spaced load support members on said load, first lift means mounted on said base means and connected to said first coupling means for selectively elevating or lowering said first coupling means relative to said functional plane, and second lift means mounted on said base means and connected to said second coupling means for selectively elevating or lowering said second coupling means relative to said functional plane, each said first and second lift means having a generally lateral dynamic lift axis and being operable independently of the other lift means and of said steering means whereby said load can be maintained substantially in a given posture or intentionally tilted therefrom, each said coupling means having pivot means for allowing said load support members and load to rotate about said dynamic lift axes, and first and second power means for independently operating each said first and second lift means, and third power means for operating said steering means.

10. The prefab home construction of claim 9 wherein each said lift means comprises (a) an elongated bearing structure encompassing said lift axis for rotatably mounting an elongated inboard journal section of said coupling means, (b) arm means having one end portion thereof pivotally mounted on said base means and having its other end portion affixed to said bearing structure, said arm means being pivotal about an axis oriented substantially parallel to said lateral axis, and (c) said first and second power means for said lift means comprises hydraulic cylinder means pivotally affixed to said base means and to said first and second lift means, wherein said journal section is provided at an outboard end thereof with an elongated wing section which is oriented generally normal to said lift axis such as to lie substantially parallel to said load support members, and wherein attachment means is provided on said wing section for securing said coupling means to a load support member.

11. The prefab home construction of claim 10 wherein each said power means comprises double acting cylinder means, and wherein electronic remote control means is provided for operating each cylinder means.

* * * * *